Sept. 12, 1944. C. E. FRASER 2,357,945
WEIGHTED BOX SEAL FOR SAND CLEANERS
Filed June 25, 1940 2 Sheets-Sheet 1
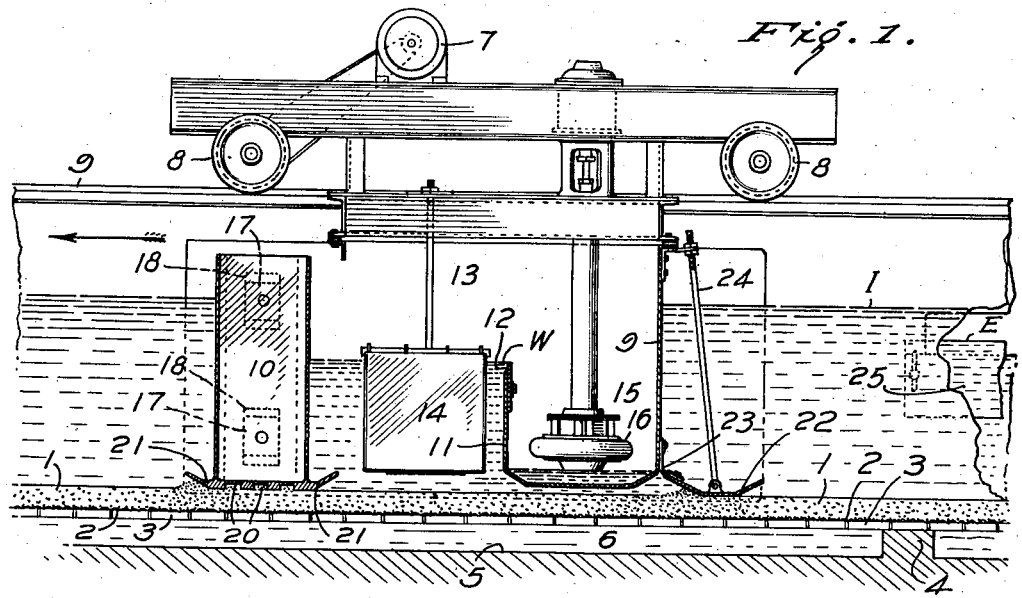
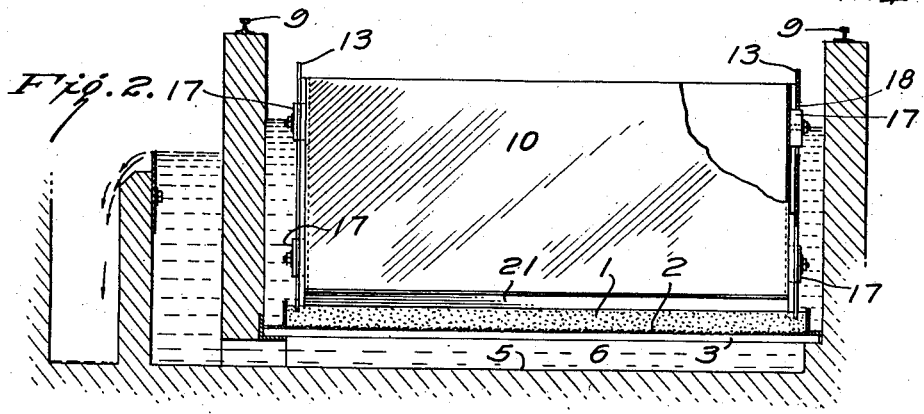
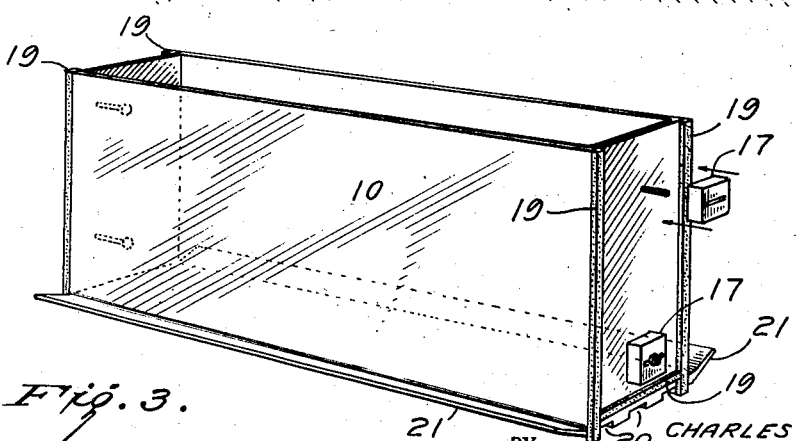
INVENTOR
CHARLES E. FRASER,
BY Ellis S. Middleton
ATTORNEY.

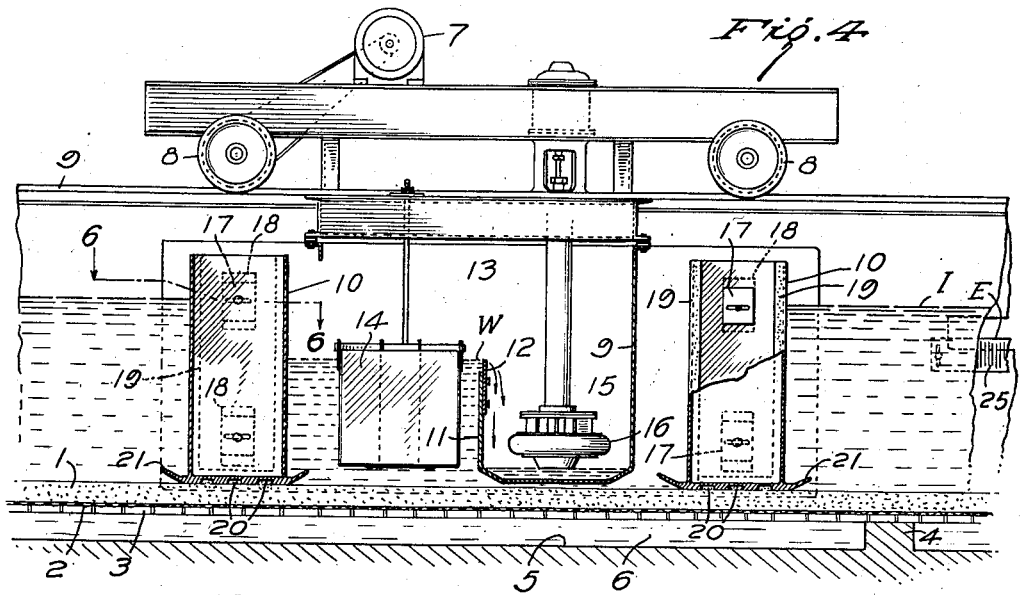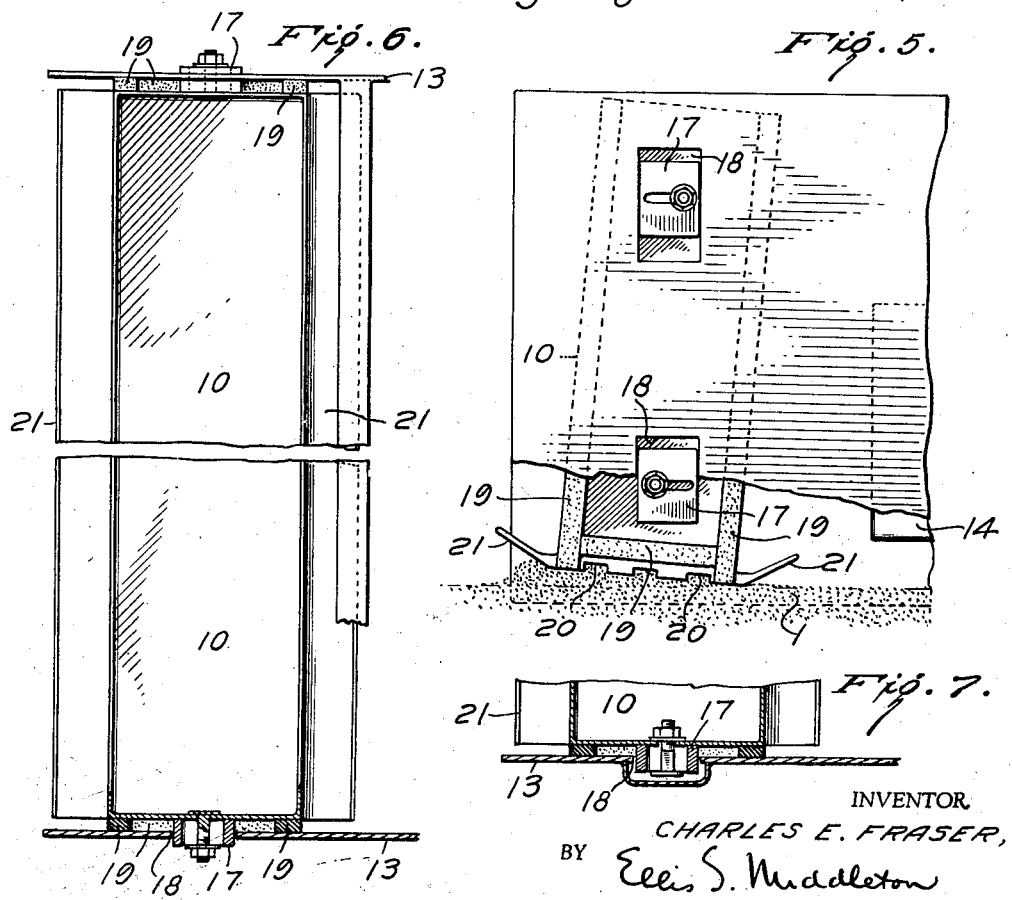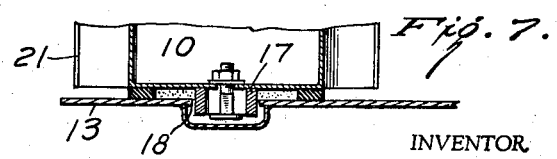

Patented Sept. 12, 1944

2,357,945

UNITED STATES PATENT OFFICE 2,357,945

WEIGHTED BOX SEAL FOR SAND CLEANERS

Charles E. Fraser, Kew Gardens, N. Y.

Application June 25, 1940, Serial No. 342,250

10 Claims. (Cl. 210—128)

The present invention relates to a method of and mechanism for cleaning filter beds.

It is common practice in the treatment of sewage, industrial wastes, etc. to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a travelling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

Seals used as above at the front and rear of the cleaner mechanism must be of a type which will make sealing contact with the bed surface even though the latter has a tendency to be uneven. The movement of liquid on top of a filter bed tends to cause hills and valleys and consequently, a sealing mechanism is necessary which will accommodate itself to these differences in levels while still maintaining contact sufficiently tight to prevent seepage of liquid thereunder.

To this end, the invention contemplates a cleaner mechanism including seals at the front or rear or both of a nature which will not only ride over any unevenness in the bed and tend to flatten them out but in which an adjustable pressure contact may be made with the bed.

The invention further consists in the novel arrangement, combination and construction of parts more fully hereinafter shown in the drawings, in which—

Fig. 1 is a side elevation partly in section of an apparatus embodying the invention;

Fig. 2 is a sectional front view of the combination of Fig. 1;

Fig. 3 is a perspective detail of a weighted sealing box;

Fig. 4 is a view similar to Fig. 1;

Fig. 5 is an enlarged side elevation partly broken away showing an adjustment of one of the sealing boxes;

Fig. 6 is a plan view partly in section along the line 6—6 of Fig. 4;

Fig. 7 is a detail showing a bearing block of a sealing box.

Referring now to Fig. 1, the usual filter bed is shown at 1 to consist of sand such as that of the magnetite or silica variety or any other aggregate or filter media. A suitable thickness of bed material rests upon a screen 2 supported by grid 3 resting upon the top of wall 4 so as to slightly space the grid from the bottom 5 of the filter tank. The space 6 serves as a channel for the outflow of effluent in a filter of the downflow type or an inflow of influent to the filter in an upflow system. A travelling cleaner mechanism may consist of a trolley driven by motor 7 through wheels 8 operating on trackway 9. Depending from the trolley is a cleaner caisson having a rear wall 9, a sealing box 10 forming in effect a front wall of the caisson, an intermediate wall 11 provided at the top with an adjustable weir 12 and two side walls 13.

Also depending from the trolley is a solenoid 14 or other agitation causing means, while in the wash water compartment 15 is a pump 16 for removing the dirty water therefrom.

As above indicated, it is desirable during the cleaning operation to seal off a section of the bed to be cleaned so that substantially no filtering action takes place therein. The instrumentalities for accomplishing such purpose may comprise extending the side walls 13 down a sufficient distance into the bed material.

As shown in Fig. 1, the caisson may be sealed at one end by means of a sealing box 10 which is in effect an open topped tank having bearing blocks 17 secured to the ends thereof, which blocks ride in corresponding slots 18 having a slightly greater vertical extent than the blocks in the side walls 13 of the caisson. Rubber strips 19 near the edge portions of the end walls of the sealing box serve to maintain a water tight connection between the end of the sealing box and the walls 13.

The bottom of the sealing box is serrated as at 20 with a series of longitudinal grooves while the extreme edges of the box are provided with upwardly extending lips 21.

In order to maintain an effective seal at the front with the above described device it only becomes necessary to weight the box 10 with sufficient ballast to make an effective seal between the bottom thereof and the top of the filter bed. Water is perhaps the most convenient ballast available and this may be readily introduced through the open top thereof to the desired extent. It is to be noted that some vertical play is permitted between the box 10 and the side walls 13.

As the cleaner box moves over the tank bottom in the direction of the arrow of Fig. 1, the forward upturned lip 21 tends to ride over the tops of any hills and carry them into the succeeding valleys. The serrated bottom 20 assists materially in levelling these inequalities so as to produce a redistributed bed having an even surface to the actual cleaning device.

At the trailing edge of the cleaner, the same or a different type of sealing device may be used. In Fig. 1, this may consist of a sliding plate 22 flexibly attached to an end wall 9 of the cleaner as by means of rubber strip 23, the main body of the plate being rigidly though adjustably attached to the cleaner as by rod 24. Consequently, as the plate 22 drags along behind the cleaner any unevenness in the bed created by the cleaning mechanism is smoothed out thereby both by reason of the fact that the forward edge of the plate 22 may rise and fall slightly due to flexible connection 23 and also because the rear portion forces a levelling off in view of the fixed relationship of that part of the plate to the bed surface which has been determined by adjusting rod 24.

In Fig. 4, a second weighted sealing box is shown similar in all substantial respects to that above described.

Where found necessary, the up-turned lips 21 on the sealing boxes may be accentuated by tipping the box into the position shown. This is particularly useful where, through unusual circumstances a considerable unevenness is found to exist in the bed surface.

In operation and with particular reference to a downflow filter, influent to be filtered is fed on top of the bed so as to maintain a level I. The liquid passes through the bed material 1 in which the solids are caught and retained, the clean effluent passing into the space beneath the bed, up a vertical channel and over the top of an adjustable weir 25. The weir determines the effluent level E which should be at a point lower than influent level I so that the hydraulic head thus created will cause a flow through the bed.

When due to retained solids, the filtering efficiency of the bed has dropped to the point where cleaning operations should be begun, the cleaner is started up. Assuming the bed to be made of sand of the magnetite variety, when the solenoid 14 is connected to a suitable intermittent source of electrical energy and energized, the sand is magnetized and an area thereof bodily lifted up toward the solenoid, thus loosening the dirt adherent to the sand. It is to be noted that by suitable adjustment of the relative height of the solenoid or the degree of magnetic force created therein, any amount of bed may be lifted from a small quantity to one completely down to the wire.

Assuming that a section of the bed down to the wire is lifted, this causes an area of agitation and weakened resistance in the bed and due to the fact that the wash water level W established by means of the adjustable weir 12 on intermediate wall 11 is below effluent level E, clean effluent from below the bed flows up through this area of lessened resistance, washes the dirt loosened from the sand and spills the thus produced wash water over the top of weir 12 into compartment 15 from which it is removed by the pump. When the solenoid 17 is deenergized, it release the magnetite, which drops back into the bed substantially clean. This cleaning operation is then repeated intermittently until the entire area of the bed has been subjected to the purging action.

In the operation of an upflow filter, much the same action takes place except that the influent to be filtered flows from beneath the bed in an upwardly direction, the liquid above the bed being clean effluent. When an area of agitation and weakened resistance is created in the bed, there is a rush of unfiltered influent through the agitated sand to clean the same rather than clean effluent as in the case of a downflow system.

In either event, the weighted sealing box or boxes of the present invention maintain efficient and adjustable contact with the bed surface, leveling the bed before and after the cleaner in an efficient manner.

With sand of different size or different specific gravity or aggregates of different type, different degrees of pressure will be required on the bed in order to make an effective seal. Such open-topped tanks used as sealing means afford ample adjustment of weight used to secure the desired degree of pressure.

While the invention has been shown and described with particular reference to specific embodiments, it is to be understood that it is not to be limited thereto but is to be construed broadly and restricted solely by the scope of the appended claims.

I claim:

1. In combination, a traveling cleaner for a filter bed adapted for movement over the bed, said cleaner having sealing means including a caisson adapted to engage the upper surface of the bed and to extend above the level of the liquid to seal off a section of the bed from a filtering action, means to agitate a portion of the bed within said section, means for washing dirt from the agitated portion of the bed, said sealing means including a weighted tank in sealing relation with and vertically movable with respect to the rest of the sealing means and adapted to make contact with the bed.

2. The combination of claim 1 in which the tank may be tilted to adjusted positions about a horizontal axis.

3. The combination of claim 1 in which the tank seal has a rib on the bottom extending in a direction substantially perpendicular to the direction of movement of the cleaner.

4. The combination of claim 1 in which the weighted tank is movably mounted in a vertical direction between the side walls of the caisson.

5. The combination of claim 1 in which the weighted tank is located between the side walls of the caisson and in which means is provided for making a water tight contact therewith.

6. The combination of claim 1 in which the tank seal has an open top whereby ballast may be introduced thereinto to adjust the degree of pressure contact between the tank bottom and the bed surface.

7. The combination of claim 1 in which the tank seal has a grooved bottom, the grooves thereof extending at substantially 90° to the direction of travel of the cleaner.

8. A traveling cleaner adapted for movement over a filter bed, said cleaner having means including a caisson adapted to engage the upper surface of the bed and to extend above the level of the liquid to seal off a section of the bed from a filtering action, means to agitate an area of the bed within the section, means for washing the agitated portion of the bed and for removing dirt therefrom, said sealing means also including tanks adapted to make sealing contact with the bed at the front and rear ends of the cleaner respectively and means for mounting the tanks in sealing relation with and vertically movable with respect to the rest of the sealing means.

9. In combination, a traveling cleaner for a filter bed adapted for movement over the bed, said cleaner having sealing means including a caisson adapted to engage the surface of the bed and extending above the level of the liquid to seal off a section of the bed from a filtering action, means within the sealing means to agitate an area of the bed within said section, and means for washing dirt from the agitated part of the bed, said sealing means including a member mounted to make sealing contact with the filter bed and with the cleaner and guideways on the side of the caisson for mounting said member to permit up and down movement of the member with respect to the cleaner.

10. In combination, a traveling cleaner for a filter bed adapted for movement over the bed, said cleaner having sealing means including a caisson adapted to engage the upper surface of the bed and to extend above the level of the liquid to seal off a section of the bed from a filtering action, means to agitate a portion of the bed within said section, means for washing dirt from the agitated portion of the bed, said sealing means including a weighted member in sealing relation with and vertically movable with respect to the rest of the sealing means and adapted to make contact with the bed.

CHARLES E. FRASER.